Inventor
T. Hindmarch

United States Patent Office 2,720,294
Patented Oct. 11, 1955

2,720,294

PRESSURE FLUID OPERATED FRICTION COUPLING SYSTEMS

Thomas Hindmarch, Chesham, England

Application February 7, 1952, Serial No. 270,473

5 Claims. (Cl. 192—4)

This invention relates to reverse direction and change ratio coupling systems, in particular as applied to ship propulsion and other power driven installations.

It has been usual, for example, to employ in a ship one turbine for one direction of running, and for the reverse direction of running, either to reverse the complete turbine or to reverse only part of the turbine especially in the case where the output in the reverse direction is lower than in the forward direction, or, as a third alternative, the reverse direction is obtained by the use of a second turbine which causes the driven shaft to rotate in the opposite direction of rotation to that of the other or main turbine. Various devices to couple and/or uncouple if necessary the turbine shaft from or to the output or driven shaft have been used, be it for one turbine or a section thereof to act as a brake against the other one at the moment of reversal, but none of these devices permits the driven or output shaft (in a ship the propeller shaft) to be driven in both directions of rotation or to remain stationary, and at the same time to derive the power for both directions of rotation from one complete turbine only running in one and the same direction all the time and be it that this turbine unit comprises for instance one or more high pressure and one or more low pressure sections, all of which form a complete turbine unit.

The object of the present invention is to provide a coupling including reverse direction or change ratio gearing in which the prime mover is prevented from running away when the drive of the coupling is rendered discontinuous while changing gear.

The invention consists in a reverse direction or change ratio coupling between one or more prime movers and one or more output shafts characterised in that one or more friction brakes are fitted between the or each prime mover and the frame of the machine so that the or each prime mover is loaded by braking when the coupling between the respective prime mover or prime movers and the output shaft or shafts is rendered discontinuous.

The invention further consists in that the reverse direction coupling includes one or more idler wheels and the or each brake is fitted between an idler wheel and the frame of the machine.

The invention still further consists in that the friction brake may be a pressure liquid operated friction coupling.

The invention still further consists in that the or each friction brake may have a cavity into which pressure liquid is introduced to engage the brake, the latter being provided with one or more orifices of restricted cross sectional area communicating between the said cavity and the external periphery of the brake, such that in the fully disengaged position of the brake the cavity is substantially filled with air, which, when the volume of the liquid in the cavity is increased to engage the brake, is driven out by way of said restricted orifice or orifices, which are of such size that, while the cavity is being filled, a resilient gaseous pressure exists in the cavity of the brake, control means being provided for controlling the rate of flow of the liquid to the said brake.

In carrying my invention into effect in one convenient manner, I provide a gas or steam turbine which is adapted at all times to run in one direction of rotation, and I arrange the turbine to drive the propeller, locomotive driving wheel, or other part to be driven through a reversing gear which may be bolted direct to the turbine casing or the turbine may be bolted on to the gear casing or the reversing mechanism may form a separate unit altogether or be otherwise suitably arranged and which may if necessary provide also for speed reduction or variation. The reversing mechanism may be of the common bevel reverse type, or it may involve separate gears for ahead and astern running or may be of any other suitable construction provided only that the selection of the particular direction of rotation is achieved by the engagement and disengagement of one or more pressure liquid operated couplings.

I can of course also provide for such a reversing mechanism, either with or without a speed ratio, between input and output shafts in the case where more than one complete turbine unit is used for driving the output shaft, and such reversing mechanism may be arranged to reverse the output shaft quite independent from the number of turbine units which are driving. Furthermore, the reversing mechanism is such that in the case of a multi-unit driven shaft, by suitable arrangement of the control means, it will be impossible to connect one or more units for one direction of rotation while the other unit or units are driving in the opposite direction of rotation. I may also drive from each input shaft the driving member of more than one set of pressure liquid operated couplings for ahead and astern running should such an arrangement be advantageous in any particular application of my invention.

The coupling in accordance with the invention is not limited to use with turbines as hereinbefore described but is applicable to use with any type prime mover, for example internal combustion engines of either the spark ignition or auto ignition types, gas, water or steam turbines or windmills, in, for example, locomotives, ships, oil well drilling rigs, rolling mills and other industrial applications.

The control of engagement and disengagement of any of the couplings within the mechanism has not been particularly mentioned, but it is of course understood that in this invention may be incorporated any suitable form of control or operating valve with the required accessories so as to obtain the desired effect of engagement and disengagement of the couplings. Such controls, may, or may not be interlocked with the speed control of the prime movers in one of the well-known manners.

The drawings show by way of example two embodiments of the invention in which:

Figure 1 shows a longitudinal section of the coupling while

Figure 3 is a diagrammatic arrangement of another embodiment while

Figure 1:
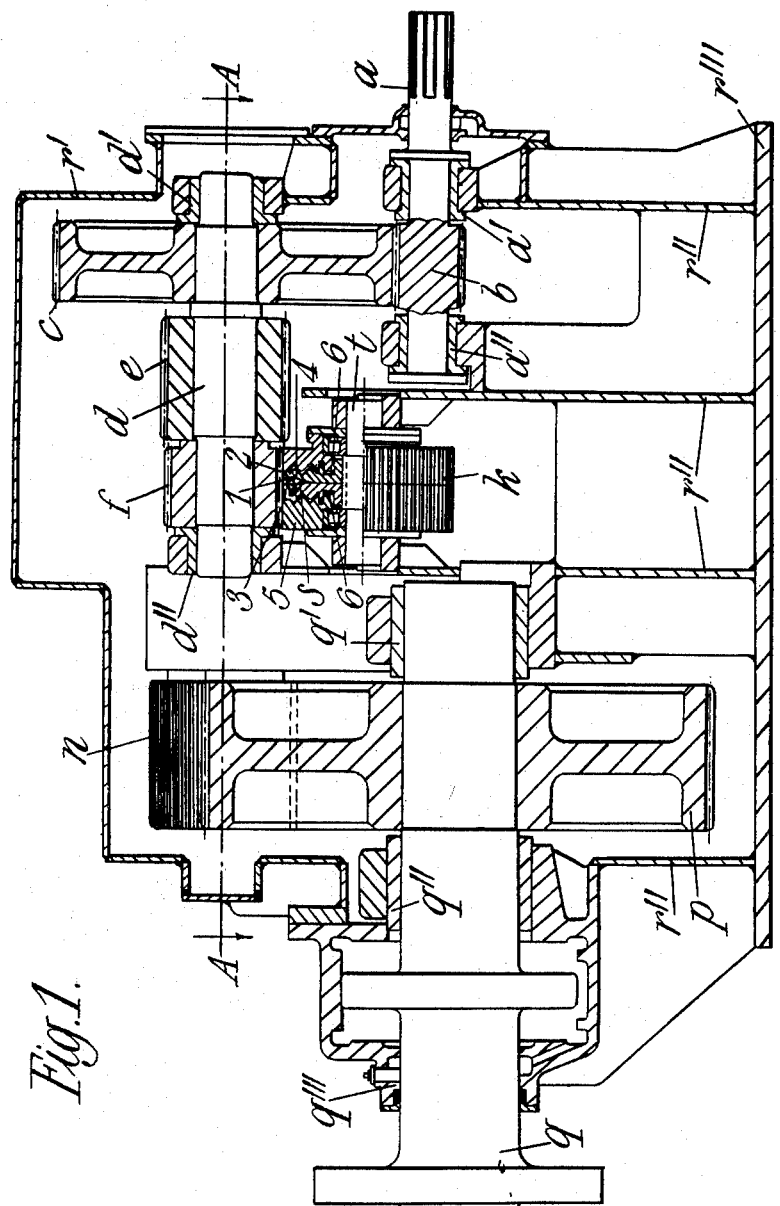
Figure 2:
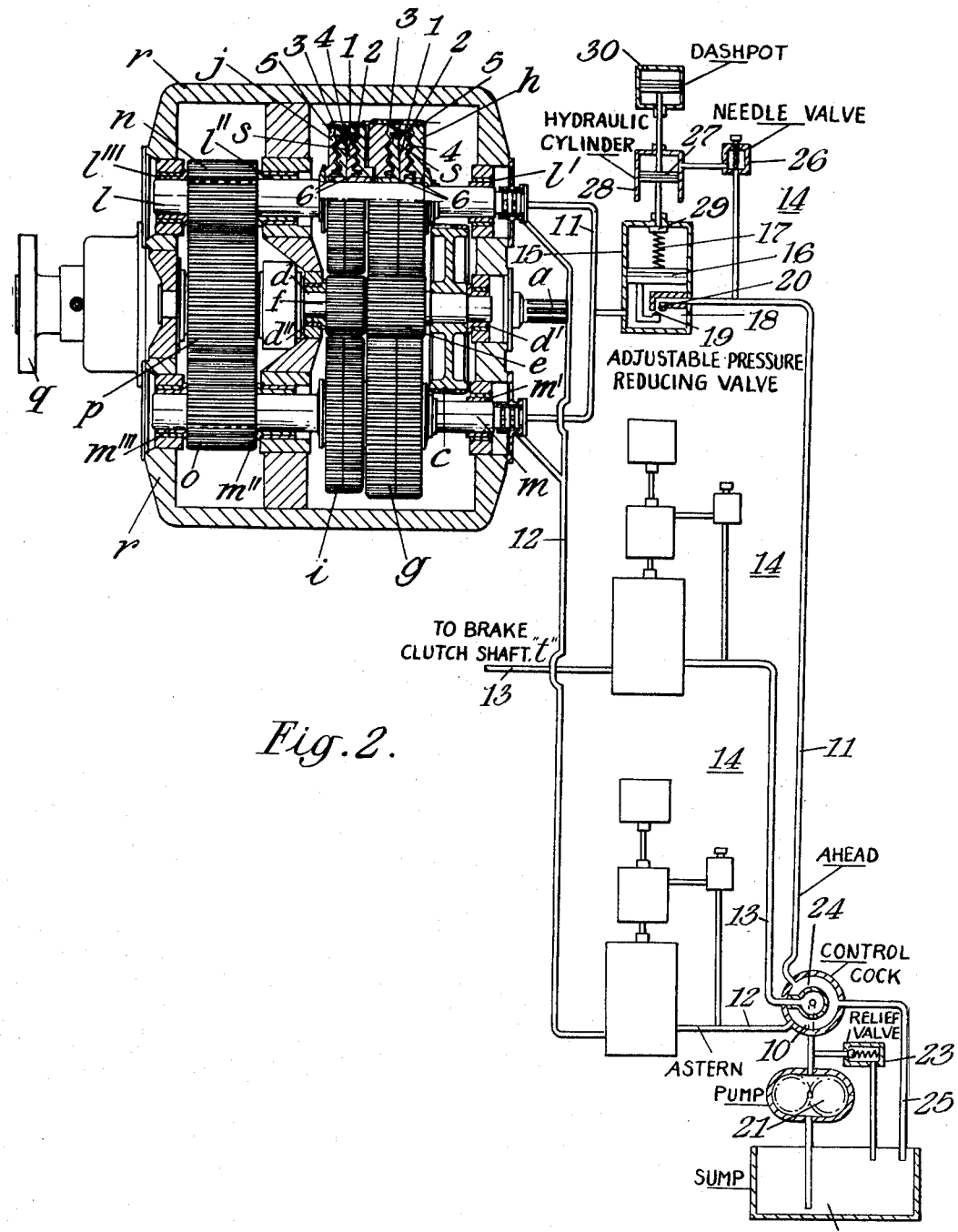
Figure 2 shows a plan of the same along the line A—A of Figure 1, including a typical fluid pressure control means.
Figure 3:
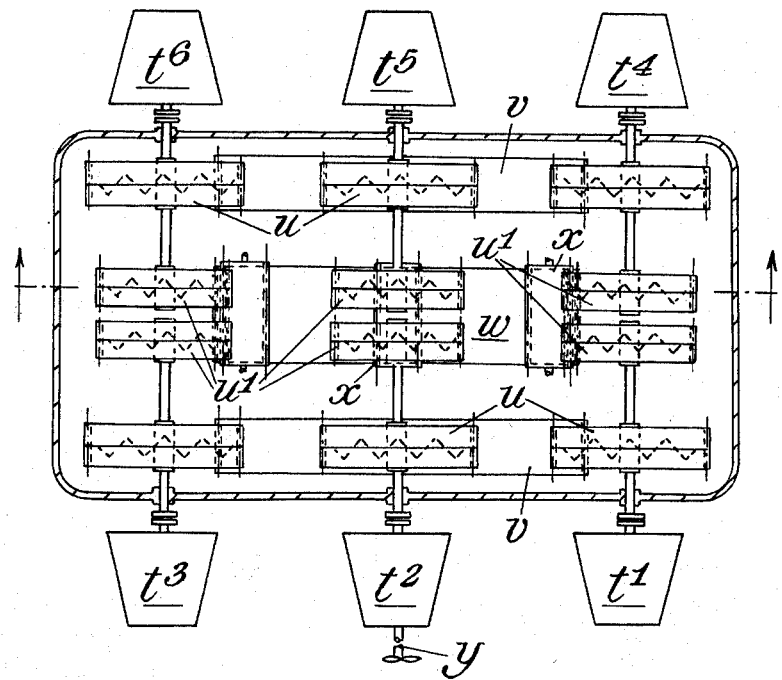
Figure 4:
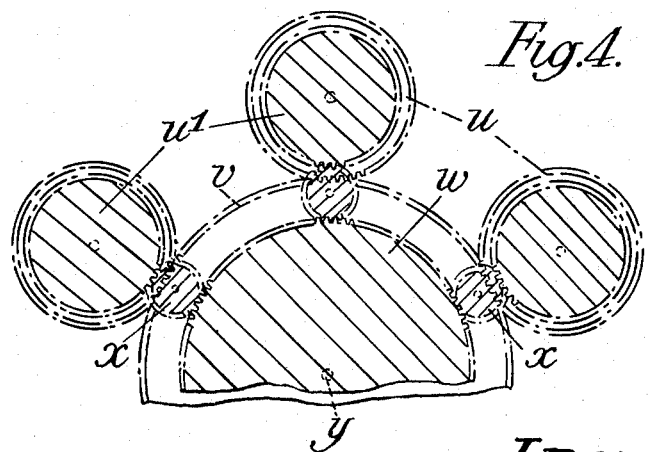

Figure 4 is a cross section through line A—A of Figure 3. In Figures 1 and 2, $a$ is the input shaft which is driven by one or more turbines, not shown, always in the same direction. This shaft, which is supported in the bearings $a'$ and $a''$ has the pinion $b$ formed thereon for driving the intermeshing gear wheel $c$ drivingly supported on the driving shaft $d$ which rotates in bearings $d'$ and $d''$. This shaft also has the forward and reverse pinions $e$ and $f$ rigidly attached thereto, the former engaging directly the clutched pinions $g$ and $h$ while the latter drives the clutched pinions $i$ and $j$ through the idler wheels $k$ which are also clutched. The clutched pinions $h$ and $j$ are mounted upon the intermediate shaft $l$ while the clutched pinions $i$ and $g$ are mounted on the intermediate shaft $m$. These shafts are supported in the bearings $l'$, $l''$ and $l'''$ and $m'$, $m''$ and $m'''$ respectively.

The intermediate shafts $l$ and $m$ also carry the gear wheels $n$ and $o$ which impart the drive to the common gear wheel $p$ on the output shaft $q$ supported in the bearings $q'$, $q''$ and $q'''$. All the above referred to bearings are supported in the main frame $r$ which is enclosed above by the casing $r'$ and supported below on the webs $r''$ from the base plate $r'''$.

The fluid pressure operated clutches in the pinions $g$, $h$, $i$ and $j$ and the brake $k$ operate in a similar manner and have each a number of restricted orifices 1 around the periphery of the clutch through which air enters the clutch space $s$ when the clutch is disengaged. When the liquid is introduced into the said space to engage the clutch the air is driven out by way of orifice 1 and the bleed holes 2 and 3, the area of said restricted orifice 1 being such that a resilient gaseous pressure is built up in the air, said pressure causing the movable plates 4 to engage the fixed plates 5. This resilient pressure continues so long as there is air in the space $s$ after which a more positive engagement is effected owing to the slower rate at which the liquid can escape through the orifice 1.

The arrangement for the supply of liquid to the various clutches is shown to the right of Figure 2, in which a three-position control cock 10 is provided which is common to the circuits for ahead conduit 11, astern conduit 12 and the brake conduit 13 on shaft $t$. There is provided in each circuit pressure control means 14, one of which is shown in cross section and comprises an automatically adjustable pressure reducing valve 15 having a piston 16 movable against the compression spring 17 by the pressure built up in the space 18 to regulate the position of the needle 19 in respect of the seating 20.

The liquid is provided under pressure by the pump 21 from the sump 22, a relief valve 23 being provided to relieve excess pressure provided by the pump. The cavity 24 is connected to the sump and allows the fluid to drain back from the clutches during disengagement by way of the pipe 25.

In order that the characteristics of the reducing valve may be manually adjustable, an adjustable needle valve 26 is provided by way of which liquid is fed to the space above the piston 27 in the hydraulic cylinder 28, thereby lowering the abutment 29 of the spring 17 and thus increasing the pressure in the space 18 at which a corresponding aperture is provided at the needle valve 19, 20. The rate at which the piston 27 moves to affect the spring 17 is governed by a dashpot 30.

The above pressure control means are described by way of example only as other known means may be substituted for the same purpose if desired.

The three control means indicated operate in the same manner.

When the flow of liquid to the spaces $s$ is reduced or prevented, the liquid is removed from said spaces by centrifugal action, air taking its place. The inner plates 4 are separated from the outer one 5 either by spring means or fluid pressure applied to the spaces 6 in the known manner.

It is preferable to arrange the restricted orifices in the periphery of the cavity and the output member so that besides acting to allow of the entrance of air on disengagement and exit of air on engagement they also provide for continuous flow of liquid through the coupling.

The size of the orifices or holes is determined by a number of requirements. If any substantial pressure is to be built up in the pressure cavity by the liquid when the cavity is full, the total area of the holes must be less than that of the channel feeding the cavity (seeing that the said holes feed to an open space around the hollow member). If a resilient air pressure is to be exerted as the cavity is filled with liquid, then these holes must offer a resistance to the exit of air. The size of the holes is related to the period of time over which resilience is required and the pressure exerted by the entrance of the liquid at this stage of engagement. On the other hand the holes must be of sufficient size to afford adequate flow to allow of a continuous flow of liquid to keep the clutch cool during slipping.

The fluid operated friction brake on the idler wheel $k$ is constructed in a similar manner to the clutches, the one frictional member being formed as part of the gear wheel while the central friction members are splined on a fixed shaft $t$ so that when the brake is engaged the rotation of the idler wheel is braked and thus the input shaft is also braked. This clutch is also fed with liquid by channels formed in the shaft $t$ in the known manner.

The Figures 3 and 4 show diagrammatically an arrangement in accordance with the invention in which six turbines $t^1$–$t^6$ drive one output shaft in a ship. The three turbines $t^1$, $t^2$, $t^3$ to one side of the arrangement of gears can for example be high pressure, intermediate pressure and low pressure units respectively while alternatively the three turbines $t^4$, $t^5$, $t^6$ on the other side can be high pressure, low pressure and low pressure respectively, both arrangements being commonly provided. Whatever the arrangements of the turbines are each of these are coupled to a driving shaft having forward and reverse gears $u$ and $u'$ the former driving the final wheels $v$ directly and the latter driving the final wheel $w$ through the idler wheels $x$, the final wheels $v$ and $w$ being fixed upon the output shaft $y$. Each of the forward and reverse pinions $y$ and $u'$ have clutches, diagrammatically represented by the zig-zag lines, associated therewith as previously described with reference to the first embodiment by which the direction and speed of engagement of the drives can be controlled. The idlers $x$ are provided with fluid actuated clutches acting as brakes as before described.

The embodiments of the invention hereinbefore specifically described are to be understood to be examples only. The type of clutch and brake used, the form of gearing used whether reverse direction or change ratio or both, the means for controlling the liquid pressure and other details for carrying the invention into effect may be varied without departing from the scope of the invention.

I claim:

1. Coupling between prime mover means and output shaft means comprising a change gear directly driven by the prime mover means and having alternative paths for the transmission of torque between said prime mover means and the output shaft means, friction clutch means in each said path for completing the drive through each path alternatively, a frame supporting the change gear and friction brake means between the prime mover means, on the prime mover side of any of said clutches, and the frame by means of which the prime mover means may be loaded by braking while in motion when the drive between the prime mover means and the output shaft means is rendered discontinuous on changing gear.

2. Coupling between prime mover means and output shaft means comprising a change gear directly driven by the prime mover means and having alternative paths for the transmission of torque between said prime mover means and the output shaft means, friction clutch means in each said path for completing the drive through each path alternatively, an idler toothed wheel engaging a toothed wheel on the prime mover side of any of the said clutches, a frame supporting the gear and friction brake means between the idler and the frame by means of which the prime mover means may be loaded by braking while in motion when the drive between the prime mover means and the output shaft means is rendered discontinuous on changing gear.

3. Coupling between prime mover means and output shaft means comprising a change gear directly driven by the prime mover means and having alternative paths for the transmission of torque between said prime mover means and the output shaft means, friction clutch means in each said path for completing the drive through each path alternatively, a frame supporting the change gear and friction brake means between the prime mover means, on the prime mover side of any of said clutches, and the frame by means of which the prime mover means may be loaded by braking while in motion when the drive between the prime mover means and the output shaft means is rendered discontinuous on changing gear, the friction brake means being pressure liquid operated and having an operating cavity provided with orifice means of restricted cross sectional area communicating between the cavity and the exterior of the same, operating liquid supply means, and liquid supply control means for controlling the flow of liquid from the supply means to the said cavity, so that in the fully disengaged position of the brake the cavity is substantially filled with air, while when the cavity is being filled with liquid by way of the control means to engage the brake, the air is driven out by way of said restricted orifice means to provide a resilient air pressure in the cavity of the brake.

4. Coupling between prime mover means and output shaft means comprising a change gear directly driven by the prime mover means and having alternative paths for the transmission of torque between said prime mover means and the output shaft means, friction clutch means in each said path for completing the drive through each path alternatively, a frame supporting the change gear and friction brake means between the prime mover means, on the prime mover side of any of said clutches, and the frame by means of which the prime mover means may be loaded by braking while in motion when the drive between the prime mover means and the output shaft means is rendered discontinuous on changing gear, the friction brake means being pressure liquid operated and having an operating cavity provided with orifice means of restricted cross sectional area communicating between the cavity and the exterior of the same, operating liquid supply means, and liquid supply control means including an adjustable liquid pressure reducing valve for controlling the flow of liquid from the supply means to the said cavity, so that in the fully disengaged position of the brake the cavity is substantially filled with air, while when the cavity is being filled with liquid by way of the control means to engage the brake, the air is driven out by way of said restricted orifice to produce a resilient air pressure in the cavity of the brake.

5. Coupling between prime mover means and output shaft means comprising a change gear directly driven by the prime mover means and having alternative paths for the transmission or torque between said prime mover means and the output shaft means, friction clutch means in each said path for completing the drive through each path alternatively, a frame supporting the change gear and friction brake means between the prime mover means, on the prime mover side of any of said clutches, and the frame by means of which the prime mover means may be loaded by braking while in motion when the drive between the prime mover means and the output shaft means is rendered discontinuous on changing gear, the friction brake means being pressure liquid operated and having an operating cavity provided with orifice means of restricted cross sectional area communicating between the cavity and the exterior of the same, operating liquid supply means, and liquid supply control means including an adjustable automatically variable liquid pressure reducing valve for controlling the flow of liquid from the supply means to the said cavity, so that in the fully disengaged position of the brake the cavity is substantially filled with air, while when the cavity is being filled with liquid by way of the control means to engage the brake, the air is driven out by way of said restricted orifice means to produce a resilient air pressure in the cavity of the brake.

References Cited in the file of this patent

UNITED STATES PATENTS

| Number | Name | Date |
|---|---|---|
| 2,136,454 | Miller | Nov. 15, 1938 |
| 2,323,753 | Jaeger et al. | July 6, 1943 |
| 2,421,206 | Kylin et al. | May 27, 1947 |
| 2,469,743 | Newton | May 10, 1949 |
| 2,501,286 | Mirossay | Mar. 21, 1950 |